Patented Feb. 17, 1953

2,628,972

UNITED STATES PATENT OFFICE 2,628,972

1,1-DIFLUOROETHYLFLUOSULFONATES AND PROCESS FOR PREPARING THEM

John Douglas Calfee, Manhasset, N. Y., and Patrick A. Florio, Wilmington, Del., assignors to Allied Chemical & Dye Corporation, New York, N. Y., a corporation of New York No Drawing. Application August 3, 1949, Serial No. 108,412

11 Claims. (Cl. 260—456)

This invention relates to valuable new 1,1-difluoroethylfluosulfonates and to a process for preparing them.

The new 1,1-difluoroethylfluosulfonates of our invention have the following general formula:

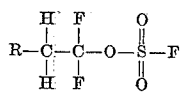

wherein R is a member selected from the group consisting of a hydrogen atom and a chlorine atom; and when R is hydrogen, being the compound 1,1-difluoroethylfluosulfonate, and when R is chlorine, being the compound 1,1-difluoro-2-chloroethylfluosulfonate.

The new 1,1-difluoroethylfluosulfonates of our invention are useful as pesticidal fumigants for instance, for exterminating the common penetrating pests such as those infesting grain, flour, carpets, textiles, etc., including grain borers, flour beetles, carpet beetle larvae, and also in controlling other pests such as roaches, bedbugs, flies, etc., as disclosed and claimed in copending application of John D. Calfee, Serial No. 108,411, filed as of even date herewith now U. S. Patent. No. 2,570,917.

The new compounds of our invention may be prepared by the reaction of fluosulfonic acid with a 1,1-difluoroethene, which, in the case of the preparation of the 1,1-difluoro-2-chloroethylfluosulfonate, is substituted in the 2-position by a chlorine atom. The reaction may be carried out in any desired manner suitable for bringing together the liquid fluosulfonic acid and the gaseous 1,1-difluoroethenes. The general reaction proceeds according to the equation given below:

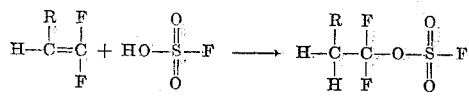

wherein R is a hydrogen or a chlorine atom.

In carrying out the preparation of the new compounds of our invention the reactants may be mixed in the approximately equimolecular proportions in which they combine, if desired, or an excess of either of the reactants may be employed. We prefer, however, to use a slight excess of the particular 1,1-difluoroethene compound employed, to insure substantially complete reaction of the fluosulfonic acid reactant. Moreover, since the 1,1-difluoroethene compounds are gases at ordinary room temperatures (the boiling point of the 1,1-difluoroethene being about −83° C. and of the 1,1-difluoro-2-chloroethene being about −19° C.), whereas the fluosulfonic acid is a liquid, B. P. about 165.5° C., we prefer to add the ethene compound to the fluosulfonic acid, conveniently, gradually or portionwise in appropriate increments.

In general, the reaction between fluosulfonic acid and the 1,1-difluoroethene compound is usually sufficiently rapid at atmospheric pressures to produce adequate results under such conditions. However, superatmospheric pressures may be employed if desired, and are particularly advantageous in commercial operations to facilitate handling of the gaseous ethene compound reactant.

Superatmospheric pressures when used may range from a few pounds per square inch to any desired convenient pressure; and usually pressures of not more than about 50 pounds per square inch in excess of atmospheric are sufficient. In cases where pressure is used, heat liberation is more rapid, and, to prevent undue temperature rise in the reactor, refrigeration may be applied. In either case, i. e. at atmospheric or superatmospheric pressures, we prefer to maintain the reaction temperature below about 50° C., as significant by-product formation begins to take place above this temperature and we prefer to carry out the reaction at temperatures not above about 30° C. At atmospheric pressures, however, somewhat lower temperatures than those employed at superatmospheric pressures are advantageous.

For the preparation of 1,1-difluoro-2-chloroethylfluosulfonate, we prefer to carry out the reaction between fluosulfonic acid and 1,1-difluoro-2-chloroethene under atmospheric pressures, due to the great rapidity of reaction of these compounds. On the other hand, the commercial preparation of the 1,1-difluoroethylfluosulfonate is preferably carried out under superatmospheric pressures.

In carrying out the operation under normal atmospheric pressures, the liquid fluosulfonic acid is charged to a reactor, preferably equipped with agitation and cooling means. The gaseous 1,1-difluoroethene compound is added conveniently through a gas disperser immersed in the liquid fluosulfonic acid, and preferably at a rate, with cooling, if necessary, such that the temperature of the reactor does not rise above about 50° C. and preferably not above about 30° C. The reaction proceeds readily and substantially completely. When the reaction is complete, as may readily be observed by the emergence of unreacted gas from the reactor, the 1,1-difluoroethylfluosulfonate reaction product may be removed and may conveniently be recovered and purified by distillation. A preliminary water wash is desirable in the case of the 1,1-difluoro-2-chloroethylfluosulfonate, whereas the 1,1-difluoroethylfluosulfonate is preferably not water washed, due to the rapidity with which it hydrolyzes in the presence of water.

In carrying out the reaction under superatmospheric pressures, the liquid fluosulfonic acid is charged to a pressure vessel, and the gaseous 1,1-difluoroethene compound is introduced into the reactor under the desired pressure, usually a pressure of not above 50 pounds per square inch gauge being sufficient. Vigorous reaction takes place which is evidenced by liberation of heat. The temperature of the reaction mixture is maintained at not above about 50° C., preferably not above about 30° C., and this may be accomplished by regulating the rate of addition of the ethene compound of by external cooling or both. When the reaction is complete, as may readily be observed by the fact that the pressure in the reactor remains constant upon cessation of introduction of gaseous ethene compound, the pressure may be released, and the liquid 1,1-difluoroethylfluosulfonate reaction product recovered by distillation.

If desired, the reaction may be carried out continuously, or batchwise at either atmospheric or superatmospheric pressures by conducting the gaseous 1,1-difluoroethene compound and liquid fluosulfonic acid countercurrent to each other through a suitable reactor such as a vertical or tower reactor. When using such a reactor, the gaseous 1,1-difluoroethene compound may advantageously be passed upwardly through the reactor countercurrent to and in reacting contact with a descending stream or streams of liquid fluosulfonic acid.

It is both surprising and unexpected that 1,1-difluoroethene and 1,1-difluoro-2-chloroethene react with fluosulfonic acid to form the 1,2- addition product as described, since experiments had shown that other analogous ethene compounds, for example the following: ethene ($H_2C=CH_2$), 1,1 - difluoro - 2,2 - dichloroethene ($Cl_2C=CF_2$), 1,1,2-trichloro-2-fluoroethene ($Cl_2C=CClF$), fail to react under similar conditions to form the corresponding ethylfluosulfonate.

The following specific examples will further illustrate our invention:

Example 1

100 parts of fluosulfonic acid were placed in a small steel autoclave fitted with a stirrer, thermometer well, and provided with a jacket for water cooling. The charge was cooled to —78° C., the vessel was evacuated and the contents warmed to room temperature and vinylidene fluoride (1,1-difluoroethene) was pressured in. Vigorous reaction took place as evidenced by an increase in reactor temperature. The rate of vinylidene fluoride addition was controlled so as to keep the reaction temperature below 30° C. When reaction was completed, as indicated by the pressure in the reactor remaining constant with the vinylidene fluoride feed line closed, the autoclave was depressurized and the contents transferred to a glass still. Practically all of the product boiled in range 73°–76° C. which indicated that substantially quantitative conversion of fluosulfonic acid to 1,1-difluoroethylsulfonate had been obtained. The product was recovered directly by distillation without washing. The 1,1 - difluoroethylfluosulfonate product is a water-clear liquid having a boiling point at 74° C. to 75° C., a vapor pressure of 137 mm. Hg at 25° C., a vapor density of 7.32 gm./1 at 25° C., and a molecular weight of 164.

Example 2

453 parts of fluosulfonic acid were placed in a glass flask immersed in an ice bath. 1,1-difluoro-2-chloroethene was introduced through a gas dispersion disk at the bottom of the reactor. The olefin was introduced quite rapidly as absorption was complete. Rate of addition was adjusted so that the temperature in the reactor did not rise above 30° C. Introduction of 1,1-difluoro-2-chloroethene was continued until unreacted gas began to emerge from the reactor. Weight of the crude point was equivalent to 930 parts. It was water washed three times, distilled, and the product, boiling 107°–109° C. collected. Yield: 750 parts equivalent to 83% of theoretical. It analyzes as follows:

|  | Found, Percent | Theory, Percent |
| --- | --- | --- |
| Sulfur | 16.77 | 16.2 |
| Chlorine | 18.07 | 17.9 |
| Fluorine | 27.6 | 29.1 |

The adduct is a colorless liquid which boils at 108° C., has a vapor pressure of 41 mm. of Hg at 25° C., a vapor density of 8.82 gm./1 at 25° C., and a molecular weight of 198.5.

The new compounds of our invention are liquids which are non-inflammable and non-explosive under ordinary atmospheric conditions which would be used in applying the compounds as fumigants, and they are relatively considerably less toxic and irritating to humans than certain of the fumigants heretofore widely used. They possess the desired high volatility and produce vapors having heavier than air characteristics which together render them excellent penetrants and permit of their ready expulsion or release from fumigated spaces after their application.

While the above describes the preferred embodiments of our invention, it will be understood that departures may be made therefrom within the scope of the specification and claims.

We claim:

1. As new compositions of matter the 1,1-difluoroethylfluosulfonates having the following general formula:

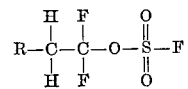

wherein R is a member selected from the group consisting of a hydrogen atom and a chlorine atom.

2. As a new composition of matter 1,1-difluoroethylfluosulfonate.

3. As a new composition of matter 1,1-difluoro-2-chloroethylfluosulfonate.

4. In a process for the preparation of new 1,1-difluoroethylfluosulfonates having the general formula:

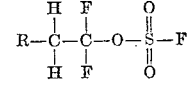

wherein R is a member selected from the group consisting of a hydrogen atom and a chlorine atom, the step which comprises contacting in the liquid phase, fluosulfonic acid with a 1,1-difluoroethene compound having the general formula:

wherein R is a member selected from the group consisting of a hydrogen atom and a chlorine atom.

5. In a process for the preparation of new 1,1-difluoroethylfluosulfonates having the general formula:

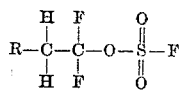

wherein R is a member selected from the group consisting of a hydrogen atom and a chlorine atom, the step which comprises contacting in the liquid phase and at pressures up to about 50 p. s. i. gauge, fluosulfonic acid with a 1,1-difluoroethene compound having the general formula:

wherein R is a member selected from the group consisting of a hydrogen atom and a chlorine atom.

6. In a process for the preparation of new 1,1-difluoroethylfluosulfonates having the general formula:

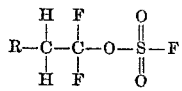

wherein R is a member selected from the group consisting of a hydrogen atom and a chlorine atom, the step which comprises contacting in the liquid phase at normal atmospheric pressure and at temperatures not above about +50° C., fluosulfonic acid with a 1,1-difluoroethene compound having the general formula:

wherein R is a member selected from the group consisting of a hydrogen atom and a chlorine atom.

7. In a process for the preparation of new 1,1-difluoroethylfluosulfonates having the general formula:

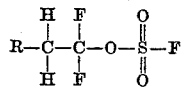

wherein R is a member selected from the group consisting of a hydrogen atom and a chlorine atom, the step which comprises contacting fluosulfonic acid in the liquid phase, at superatmospheric pressures of not more than about 50 p. s. i. gauge and at temperatures not above about 50° C., with a 1,1-difluoroethene compound having the general formula:

wherein R is a member selected from the group consisting of a hydrogen atom and a chlorine atom.

8. In a process for the preparation of 1,1-difluoroethylfluosulfonate, the step which comprises introducing gaseous 1,1-difluoroethene into liquid fluosulfonic acid at superatmospheric pressures of not above about 50 p. s. i. gauge, while maintaining the temperature of the reaction mixture at not above about 50° C., until reaction is substantially complete.

9. In a process for the preparation of 1,1-difluoro-2-chloroethylfluosulfonate, the step which comprises introducing at normal atmospheric pressures, gaseous 1,1-difluoro-2-chloroethene into liquid fluosulfonic acid, while maintaining the temperature of the reaction mixture at not above about 25° C., until reaction is substantially complete.

10. In a process for continuously preparing a 1,1-difluoroethylfluosulfonate having the general formula:

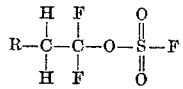

wherein R is a member selected from the group consisting of a hydrogen atom and a chlorine atom, the step which comprises continuously passing a gaseous 1,1-difluoroethene compound having the general formula:

wherein R is a member selected from the group consisting of a hydrogen atom and a chlorine atom countercurrently to a stream of liquid fluosulfonic acid and in reacting contact therewith, and continuously withdrawing the reaction product.

11. The process of claim 10, wherein the gaseous 1,1-difluoroethene compound is passed upwardly through and countercurrent to a descending stream of liquid fluosulfonic acid.

JOHN DOUGLAS CALFEE.
PATRICK A. FLORIO.

REFERENCES CITED

The following references are of record in the file of this patent:

UNITED STATES PATENTS

| Number | Name | Date |
|---|---|---|
| 1,448,276 | Landau | Mar. 13, 1923 |
| 2,061,618 | Downing | Nov. 24, 1936 |
| 2,403,207 | Barrick | July 2, 1946 |
| 2,482,755 | Linn | Oct. 7, 1947 |
| 2,450,863 | Altamura | Oct. 5, 1948 |

FOREIGN PATENTS

| Number | Country | Date |
|---|---|---|
| 804,545 | France | Oct. 26, 1936 |
| 458,179 | Great Britain | Dec. 9, 1936 |

OTHER REFERENCES

Steinkopf: J. Prakt. Chemie, vol. 117 (1928), pp. 1-83.

Martin: B. I. O. S. Final Report No. 1095, item No. 22, pages 51, 59 and 60; March 24, 1947.